J. E. ISAACSON.
TRAP.
APPLICATION FILED DEC. 23, 1915.
1,215,279.
Patented Feb. 6, 1917.
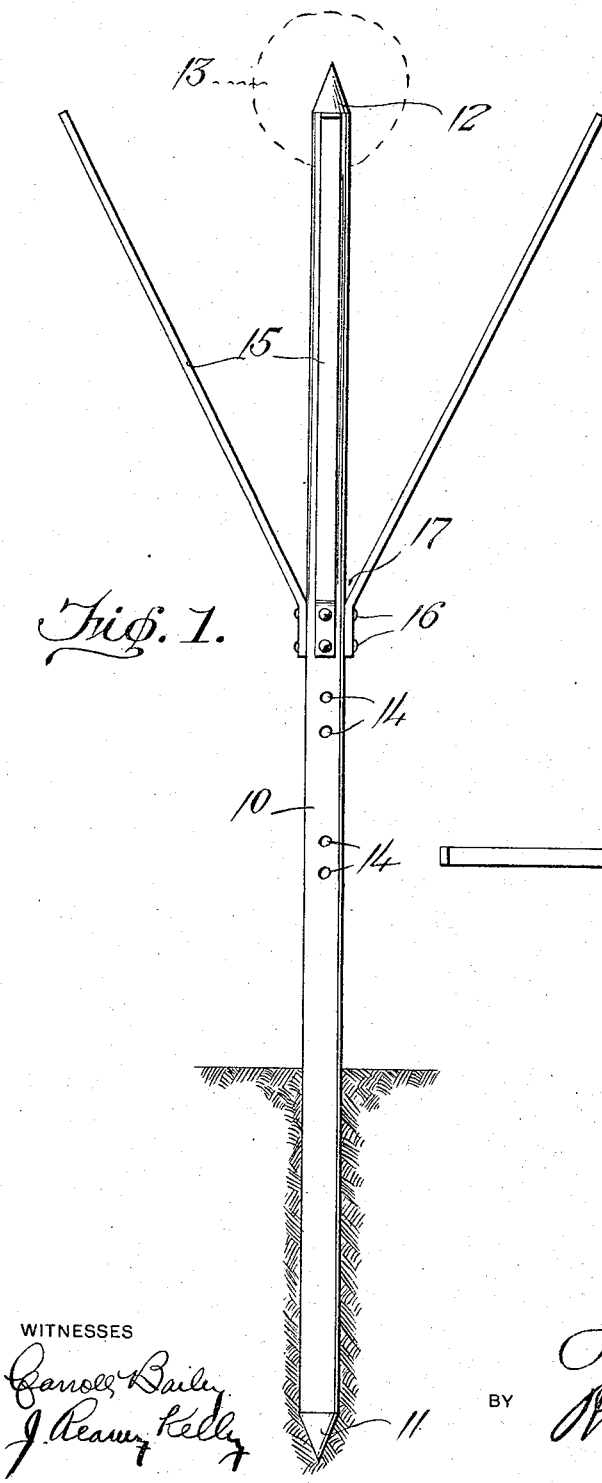
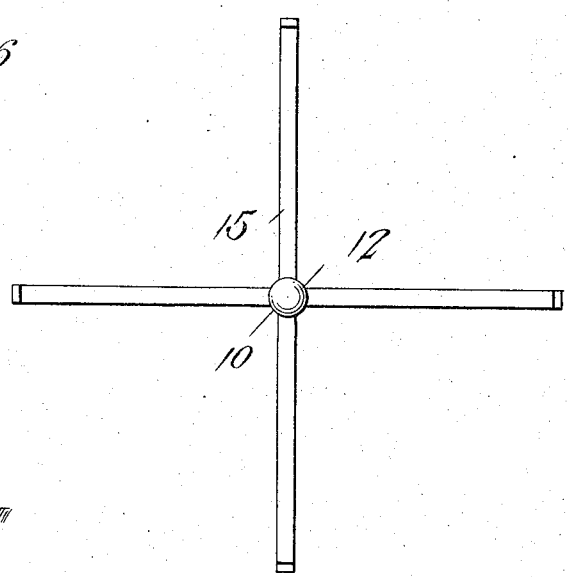

UNITED STATES PATENT OFFICE.

JOHN E. ISAACSON, OF KIMBALL, MINNESOTA.

TRAP.

1,215,279.        Specification of Letters Patent.        Patented Feb. 6, 1917.

Application filed December 23, 1915.   Serial No. 68,401.

*To all whom it may concern:*

Be it known that I, JOHN E. ISAACSON, a citizen of the United States, residing at Kimball, in the county of Stearns and State of Minnesota, have invented certain new and useful Improvements in Traps, of which the following is a specification.

The present invention has relation to a new and improved trap; and as its primary object it contemplates the provision of a device of this character, that may be easily and quickly affixed to the ground or other structure in connection with which it is used, and which includes means to retain the bait in a position whereby the animal will be enticed to jump therefor and thus be engaged with the respective holding arms.

A further object of my invention is to provide a device of the type in question that is extremely simple in construction, strong and durable, and highly practical both from the standpoint of the manufacturer and the standpoint of the user; and which, it is believed, may be manufactured at a comparatively low cost.

Various other objects and advantages will become apparent during the continuance of the following description.

These objects are accomplished by such means as are shown in their preferred form in the accompanying drawings, described in the following specification and then more specifically pointed out in the appended claims.

In the accompanying drawings wherein like characters designate like parts throughout the several views:—

Figure 1 is a view in side elevation of my improved trap, showing the same as in its preferred embodiment;

Fig. 2 is a view in top plan showing more clearly the arrangement of the respective holding arms.

In reducing my invention to practice, I preferably provide a main or carrying member 10, that may be formed of any suitable or desirable material, such for instance as a cast metal. At its ends, the member 10 may be sharpened or tapered as at 11 and 12 respectively in the first instance to facilitate its attachment to the ground or other structure in connection with which it may be used, and in the second instance to provide for the secure retainment of the bait. As clearly shown in Fig. 1, the bait, such as designated by the numeral 13, may be thrust on the projecting end of the member and thus securely held.

The member 10 is further provided with a series of openings 14 that are spaced throughout its longitudinal extent as shown in Fig. 1. These openings are designed to facilitate the attachment of these member holding arms and to permit adjustment thereof longitudinally with respect to the member so that the trap may be used advantageously in connection with the different existing circumstances.

The holding arms above referred to, are preferably formed or constructed from a resilient sheet metal. At their one end, the arms 15 may be affixed to the member 10 such as by passing suitable fastening members 16 through certain of the openings 14. By reason of the fact that the openings 14 are spaced throughout the longitudinal extent of the member 10 as before stated, the various arms may be adjusted in accordance with the desire of the operator. Adjacent their point of connection with the member 10, the arms 15 may be bent to extend diagonally therefrom such as shown in Fig. 1, so as to form a sharp apex at the point indicated by the numeral 17. The angle of disposition of the arms 15 with respect to the member 10 may be varied materially, although it is preferable that they be made to extend at a rather acute angle therefrom.

In the operation of my improved trap, the main member 10 is affixed to the ground or other support in connection with which it is to be used, after which the bait may be positioned thereon in the manner stated hereinbefore. The bait will of course be spaced a material distance above the ground or other support, such for instance as three or four feet, or even more, this of course being regulated in consistence with the nature of the animal for which the trap is set. When the animal jumps for the bait, its front paws will be thrust between the holding arms in an obvious manner. Consequently, as he falls back to the ground, the aforesaid paws will be forced into the apex 17 adjacent the point of connection of the arms 15 and the main member 10 and thus held securely by the arms. The entire weight of the animal will tend to draw the paws into the apexes before mentioned and the animal will thus be held in a suspended position. The holding arms will give slightly under the weight of the animal although this will in fact create a more secure binding action.

From the foregoing, it is believed that the advantages and novel features of my invention will be readily understood and therefore further detail description is deemed unnecessary.

In reducing my invention to practice I find that the form referred to herein as the most practical and preferred embodiment is the most efficient, but realizing that certain conditions will necessarily vary in concurrence with the adoption of my device, I desire to emphasize the fact that various minor changes in the details of construction and in the proportion of parts may be resorted to when required without sacrificing any of the advantages of my invention as defined in the appended claims.

Having thus fully described my invention, what I claim is:—

1. In a device of the character described, a supporting member, bait holding means provided thereon, and a plurality of arms adjustably mounted on said supporting member and projecting upwardly at an acute angle with respect thereto, substantially as described.

2. In a device of the character described, a supporting member, said member being sharpened at one end to facilitate its attachment to the ground and at the other end to facilitate the attachment of bait thereto, said member provided with transverse openings intermediate its ends, a plurality of holding arms, members to be passed through certain of said openings to affix one end of said holding arms to said member, and said holding arms being bent to extend at an acute angle with respect to the general extent of said member to form a sharp apex at their point of connection to said member, as and for the purpose specified.

In testimony whereof I affix my signature in presence of two witnesses.

JOHN E. ISAACSON.

Witnesses:
  OLOF ANDERSON,
  OLAF L. OLSON.